United States Patent [19]

Krueger et al.

[11] Patent Number: 5,542,792

[45] Date of Patent: Aug. 6, 1996

[54] CUTTING DEVICE WITH REMOVABLE NOSEPIECE

[75] Inventors: Douglas A. Krueger, Wauwatosa; Sebastian Ebenhoch, Sussex, both of Wis.

[73] Assignee: Waukesha Cutting Tools, Inc., Waukesha, Wis.

[21] Appl. No.: 171,646

[22] Filed: Dec. 21, 1993

[51] Int. Cl.⁶ ...................................................... B23C 5/22
[52] U.S. Cl. .............................. 407/35; 407/41; 409/234
[58] Field of Search ............................. 407/31, 34, 41, 407/46, 48, 52, 54, 53; 408/200, 231, 233, 239 R, 713; 409/234; 907/35

[56] References Cited

U.S. PATENT DOCUMENTS

| | | | |
|---|---|---|---|
| 1,702,485 | 2/1929 | Severson | 407/47 |
| 2,398,491 | 4/1946 | Bell | 408/239 |
| 4,519,731 | 5/1985 | Jester et al. | 407/46 |
| 4,580,472 | 4/1986 | Kastner | 82/37 |
| 4,648,763 | 3/1987 | Safranek | 409/234 |
| 4,655,631 | 4/1987 | Mitchell | 409/233 |
| 4,784,543 | 11/1988 | Mitchell et al. | 409/234 |
| 4,813,829 | 3/1989 | Koppelmann | 409/136 |
| 4,824,274 | 4/1989 | von Haas | 403/24 |
| 4,861,203 | 8/1989 | Bassett et al. | 409/136 |
| 4,964,762 | 10/1990 | Arai et al. | 407/34 |
| 5,037,254 | 8/1991 | Asberg | 409/233 |
| 5,064,322 | 11/1991 | Pisani | 409/234 |
| 5,190,419 | 3/1993 | Lindberg et al. | 407/54 |

*Primary Examiner*—M. Rachuba
*Assistant Examiner*—Kenneth J. Hansen
*Attorney, Agent, or Firm*—Foley & Lardner

[57] ABSTRACT

A cutting apparatus for use with a machine tool is disclosed. The cutting apparatus includes a removable nosepiece assembly having a retainer and a nosepiece that fits over the retainer. The nosepiece includes a pair of bores configured to receive lock pins which cooperate with the retainer to securely hold the nosepiece with respect to the cutter body. This allows cutter inserts to be located both along the circumference of the nosepiece and across the frontal face of the nosepiece.

9 Claims, 5 Drawing Sheets

CUTTING DEVICE WITH REMOVABLE NOSEPIECE

FIELD OF THE INVENTION

The present invention relates generally to cutting devices which can be mounted to a machine tool, such as a multi-axis milling machine, and particularly to such cutting devices having removable nosepieces.

BACKGROUND OF THE INVENTION

Machine tools are used for a variety of machining operations, such as milling, drilling, boring, and reaming. Different types of cutting devices are rotatably mounted to such machine tools via an appropriate attachment device, such as a chuck. The cutting device is then rotated as it is moved into a material undergoing a machining operation. For example, a cutting device designed for milling can be attached to a machine tool and used to cut metal from a workpiece.

Cutting devices typically include a tool body or cutter body attached to a shank designed to be held by the machine tool. Generally, a plurality of cutter inserts will be mounted longitudinally along the exterior of the cutter body. A nosepiece is either integrally formed with the cutter body or constructed as a separate component. The nosepiece is critical since it is usually the portion of the cutting device which initiates the cutting of the material. Often, it is desirable to make nosepieces interchangeable so that different nosepieces may be attached to the cutter body for specific cutting operations or when the cutter inserts become dull or worn.

Some current interchangeable nosepieces have a center bore extending longitudinally therethrough. This type of nosepiece is keyed to the cutter body to prevent rotation of the nosepiece with respect to the cutter body. Existing cutter bodies also include a longitudinal threaded bore to receive a retaining bolt which holds the nosepiece to the cutter body. Although this arrangement works well for many machining operations, the retainer bolt does not allow placement of cutter inserts placed centrally in the front face of the nosepiece (i.e. the face generally perpendicular to the axis of rotation of the nosepiece). As a result, such nosepieces are able to machine the side of a workpiece, but they are not capable of effectively drilling due to the absence of cutting inserts at the front face of the nosepiece.

As five-axis and six-axis machine tools become more common, cutting devices with the ability to cut both at the front face and along the edge are important to take advantage of the added efficiencies of such multi-axis equipment. For example, in certain machine tool operations, such as the cutting of dies, it is often desirable to move the cutter straight into the material and then rotate it or move it in various other directions to form the specific contours of the desired die. To do this quickly and efficiently, it is desirable to have a cutting device with a front face having a relatively large diameter, and cutting inserts located on the front face and the circumferential surface of the device.

Currently, the above-described operations are primarily accomplished with either a ball nose cutter or a cutting device having an integral cutter body and nosepiece. There has not been a satisfactory way of making interchangeable nosepieces with center cutting capability. Ball nose cutters are older style cutters having two flutes and a rounded nosepiece for cutting. One problem with such cutters is the relatively small area of cutting at the front of the tool. With such a cutter, the milling of a die, for instance, requires numerous passes to achieve the desired die contour.

In the alternative, cutters have been designed with a wider frontal face and centrally located cutter inserts to cut a wider diameter path at each pass of the cutting device. As mentioned above, however, these devices tend to have the cutter body and nose piece formed as a single unit. This can have many disadvantages. For instance, if a die manufacturer is currently using cutter devices with removable nosepieces but plans to convert to five and six axis machine tools, that manufacturer would need to replace its existing nosepieces and cutter bodies. This would make the conversion to multiple axis machinery more expensive. Additionally, every time a different machining operation required a different nosepiece, the entire cutter body and nosepiece configuration would need to be replaced.

It would be advantageous if the nosepieces could be interchanged rather than interchanging the entire cutter body. Then, if a different machining operation were required or if the cutter inserts on the nosepiece became worn, a different nosepiece could be attached to the cutter body with minimal down time. Also, since many fabricators and manufacturers already use cutter bodies designed for use with conventional removable nosepieces, it would be beneficial to provide center and side cutting nosepieces that could be used with such existing cutter bodies.

SUMMARY OF THE INVENTION

The present invention features a nosepiece assembly configured for attachment to a cutter body which is rotatable about a central longitudinal axis. The cutter body also has a nosepiece mounting end which includes an abutment surface.

The nosepiece assembly comprises a retainer configured for attachment to the nosepiece mounting end of the cutter body. When attached, the retainer has at least a portion extending from the mounting end. This portion includes a force wall or ledge disposed generally transverse to the central longitudinal axis of the cutter body.

The assembly also includes a nosepiece having a first surface configured for engagement with the abutment surface of the cutter body, a second surface axially opposite the first surface, and an exterior circumferential surface extending between the first and second surfaces. A cavity is disposed in the nosepiece and extends through the first surface. The cavity is configured to receive the retainer portion when the first surface of the nosepiece is placed against the abutment surface of the cutter body. At least one bore extends intermediate the exterior circumferential surface and the cavity. The bore is oriented to be offset from the force wall when the nosepiece is placed over the retainer portion. A lock pin corresponding to the bore is configured for insertion into the bore to frictionally engage the force wall. As the lock pin is inserted farther into the bore, the nosepiece is forced more tightly against the abutment surface to secure the nosepiece to the cutter body.

DESCRIPTION OF THE DRAWINGS

The invention will hereafter be described with reference to the accompanying drawings wherein like referenced numerals denote like elements, and.

DETAILED DESCRIPTION OF THE PREFERRED EMBODIMENT

In this description, a cutting device of the type which can be used with modern machine tools is described. The illustrated embodiment is an end mill type cutter which can be used for a variety of machining operations. However, the detachable nosepiece assembly can be adapted for use with a wide variety of cutting devices, including those used for milling, drilling, boring, reaming, or any combination of these machining operations.

Figure 1:
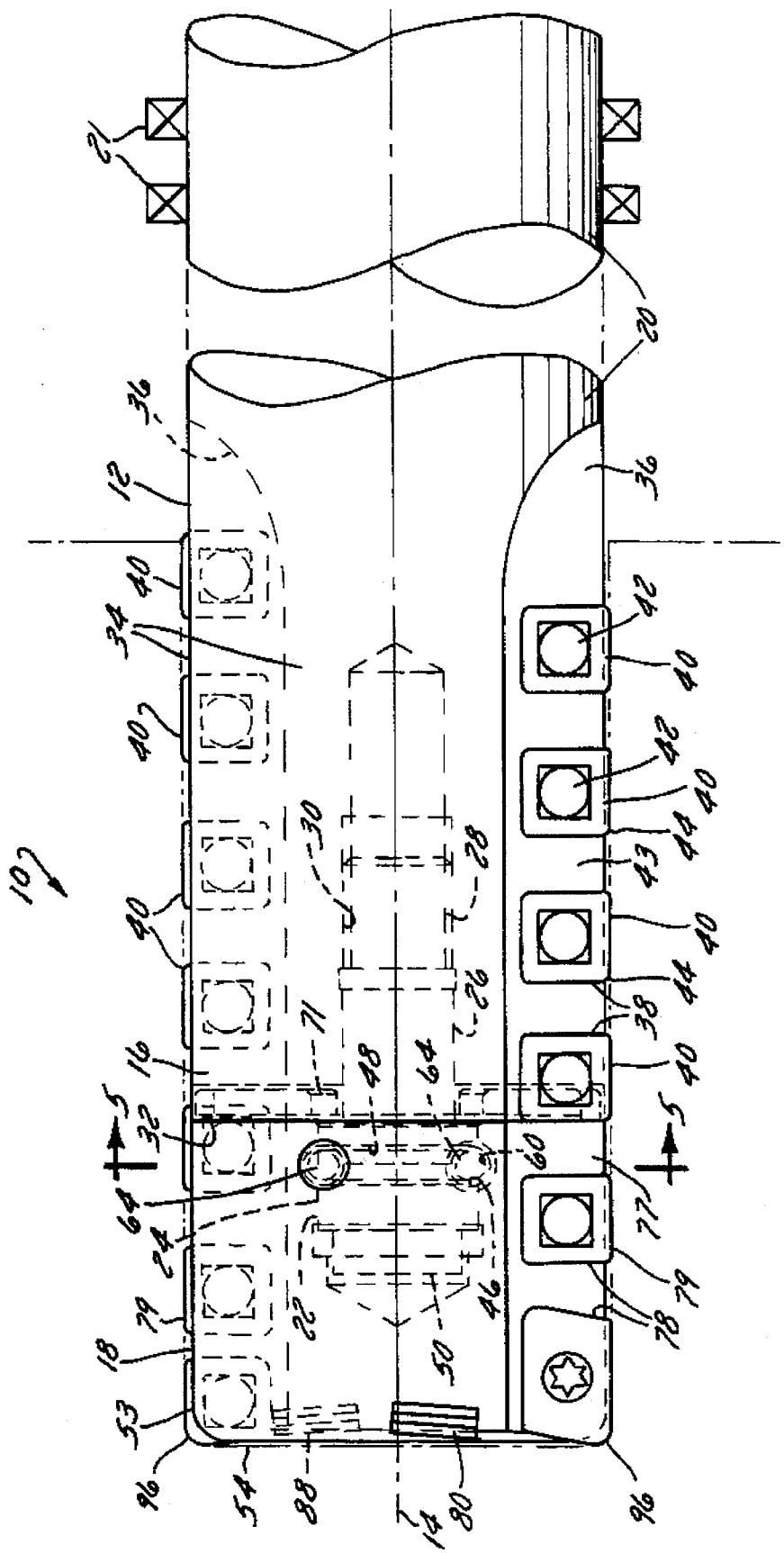
FIG. 1 is a side view of a cutter body and attached nosepiece according to a preferred embodiment of the present invention.

Referring generally to FIG. 1, an apparatus 10 for performing a variety of machining operations is shown. Apparatus 10 includes a tool body or cutter body 12 which is rotatable about a central longitudinal axis 14. Cutter body 12 includes a nosepiece mounting end 16 to which a nosepiece 18 may be attached. Opposite mounting end 16, cutter body 12 includes a shank end 20 to which some type of shank (not shown) is attached. The shank would typically be configured for receipt in the chuck assembly of a machine tool which, in turn, would be rotatably mounted in a bearing set 21 that allows cutter body 12 to rotate about axis 14.

A retainer 22 is attachable to the nosepiece mounting end 16 of cutter body 12. Retainer 22 includes a retaining portion or head 24 which extends from mounting end 16. Retainer 22 and retaining portion 24 can take a variety of configurations and retainer 22 can be attached to cutter body 12 in many different ways. However, it is preferred that retainer 22 be generally bolt shaped and that retaining portion 24 comprise the head of the bolt. In this configuration, retainer 22 includes a stem 26 and a threaded portion 28 received in a threaded bore 30 disposed in cutter body 12. Threaded bore 30 extends into mounting end 16 through an abutment surface 32 of cutter body 12.

Cutter body 12 can be of a variety of shapes and configurations but a helical style cutter body will be described. Helical cutter body 12 includes a plurality of helical ribs 34 separated by spaces otherwise known as flutes 36. Preferably, there are four (4) helical ribs 34 and each helical rib 34 includes a plurality of receiving surfaces 38, each configured for receiving a cutter insert 40.

Cutter inserts 40 are attached to corresponding receiving surfaces 38 by an appropriate fastener 42, such as a bolt threaded into a corresponding threaded aperture in the helical rib 34. The cutter inserts primarily extend from a side surface 43 of each helical rib into the adjacent flute 36. However, each cutter insert 40 includes at least one cutting edge 44 which extends slightly beyond the circumference of cutter body 12 to provide cutting along the side of cutter body 12.

In the preferred embodiment, each circumferentially consecutive rib has cutter inserts 40 disposed in a longitudinally offset position from the cutter inserts 40 on the preceding rib. This ensures that there will be no gaps in the cutting of material along the side of cutter body 12. Preferably, cutter inserts 40 located on one pair of opposite ribs cut along the same paths, while cutter inserts 40 located on the other pair of opposite ribs are disposed in a longitudinally overlapping arrangement with the cutter elements on the first pair of ribs. With this arrangement, the cutter inserts 40 cooperate to cut material longitudinally along the entire side of cutter body 12.

Figure 2:
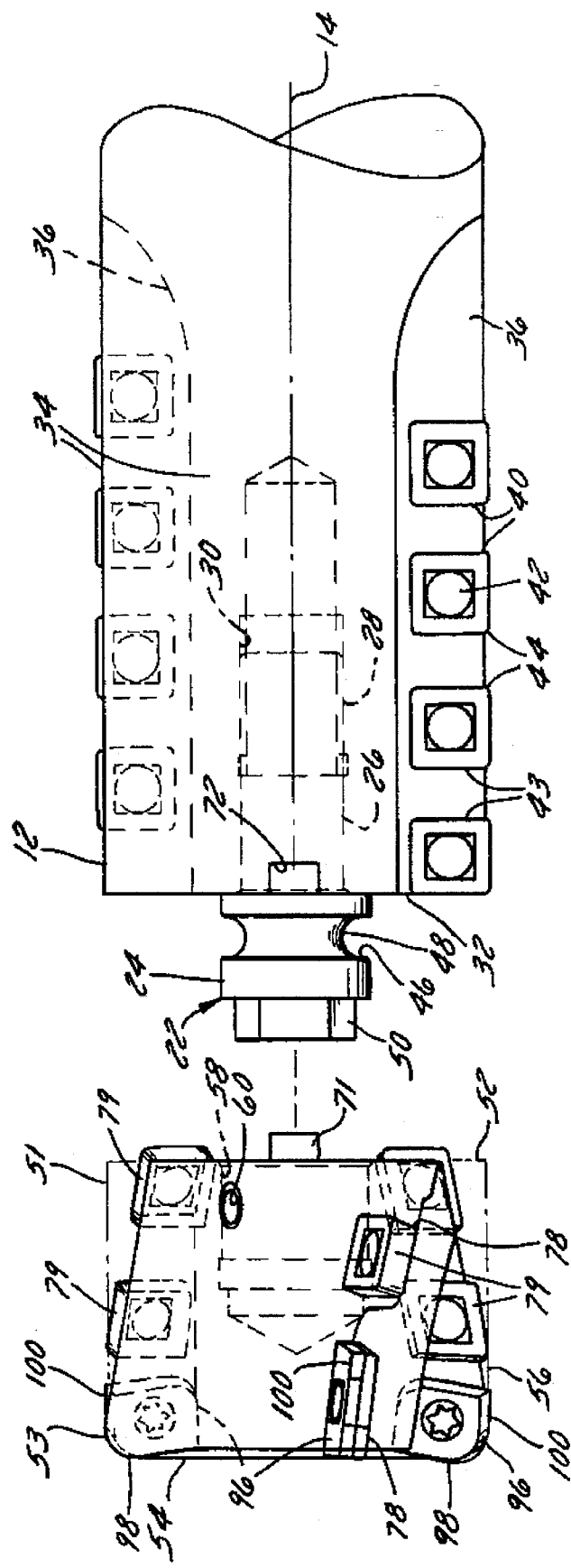
FIG. 2 is side view showing the nosepiece separated from the cutter body.
Figure 3:
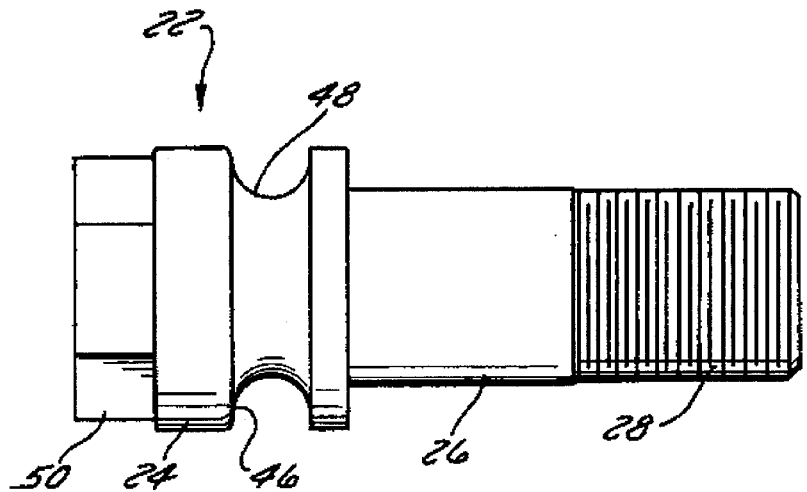
FIG. 3 is a side view of a nosepiece retainer.
Figure 4:
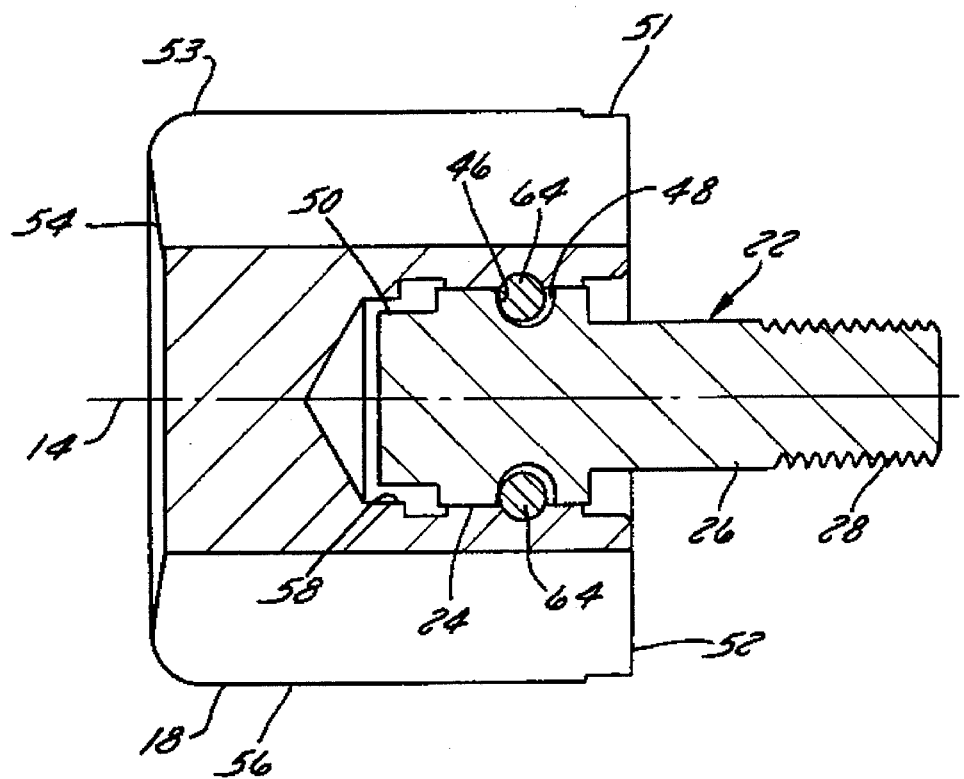
FIG. 4 is a partial cross-sectional view of the nosepiece and retainer taken generally along the longitudinal axis.

With general reference to FIGS. 2–4, the interaction of retainer 22 and nosepiece 18 is more fully described. In the preferred embodiment, retainer 22 is attached to cutter body 12 by turning threaded portion 28 of stem 26 into threaded bore 30, preferably disposed along central longitudinal axis 14. When retainer 22 is tightened in threaded bore 30, retaining portion or head 24 extends longitudinally from abutment surface 32.

Head 24 includes a force wall 46 which is used as a stop against which leverage may be applied to tightly secure nosepiece 18 to cutter body 12. This interaction will be described more fully below. Force wall 46 is preferably created by forming a recess 48 in head 24. Recess 48 can take a variety of forms, including one or more partial bores extending into or full bores extending through head 24, but recess 48 is preferably in the form of an annular groove about the circumference of head 24. Recess 48 should be formed so force wall 46 extends generally transverse to central longitudinal axis 14 when retainer 22 is attached to cutter body 12. This facilitates the use of force wall 46 as a stop against which leverage may be applied to securely force nosepiece 18 towards cutter body 12. Head 24 also preferably includes an outer longitudinal end 50 configured to facilitate tightening of retainer 22 into cutter body 12. For instance, outer end 50 can have an external or internal hexagonal shape appropriately sized to receive a wrench for rotating retainer 22 and tightening it against cutter body 12.

Nosepiece 18 is designed to fit over head 24. Nosepiece 18 includes a first end 51 having a first surface 52 configured for engagement with abutment surface 32. A second end 53 having a second surface 54 is disposed axially opposite first surface 52. First surface 52 and second surface 54 are separated by an exterior circumferential surface 56 extending therebetween. Second surface 54 is a front or frontal surface of nosepiece 18 and preferably has a slight concavity.

Nosepiece 18 also includes a cavity 58 extending through first surface 52 and configured to receive head 24. When nosepiece 18 is attached to cutter body 12, head 24 extends into cavity 58 allowing first surface 52 to lie in proximity to abutment surface 32.

Figure 5:
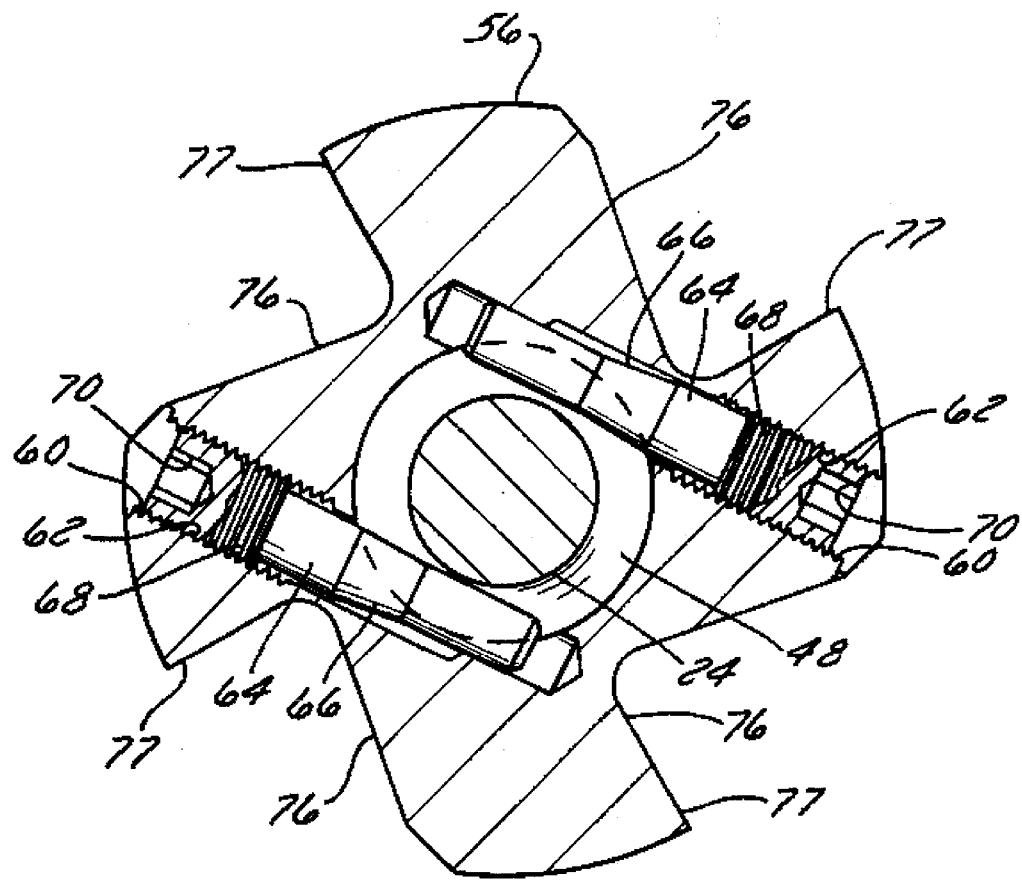
FIG. 5 is a cross-sectional view taken generally along line 5—5 of FIG. 1 showing a pair of lock pins in a recess of the retainer.

Nosepiece 18 also includes at least one bore 60 and preferably two bores 60 extending intermediate exterior circumferential surface 56 and cavity 58. (See also FIG. 5) Preferably, bores 60 are oriented to be generally aligned with recess 48 but slightly offset from force wall 46 when nosepiece 18 is placed over head 24. With two bores 60, each bore extends along the circumference of cavity 58 and is disposed on the radially opposite side of cavity 58 from the other bore 60. Preferably, each bore has a threaded region 62 typically located between exterior circumferential surface 56 and cavity 58.

Nosepiece 18 is locked against cutter body 12 by inserting a lock pin 64 into each bore 60. Due to the orientation of each bore 60, including the slight offset of each bore with respect to force wall 46, proper insertion of a lock pin 64 will cause the lock pin to frictionally engage force wall 46 and drive nosepiece 18 towards cutter body 12 until the components are securely connected.

Figure 6:
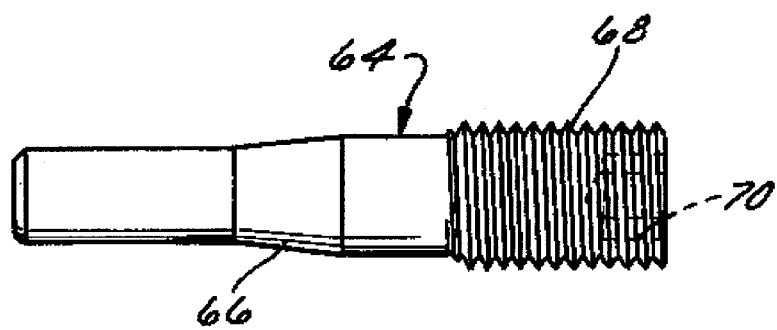
FIG. 6 is a side view of one of the lock pins.

The combination of nosepiece 18, retainer 22, and lock pin 64 forms an overall nosepiece assembly 65 as illustrated best in FIG. 4. In the preferred embodiment illustrated in FIGS. 5 and 6, each lock pin includes a tapered region 66 and a threaded portion 68 configured to threadably engage the corresponding threaded region 62 of the corresponding bore 60. Thus, as each lock pin 64 is threaded farther into its respective bore 60, the tapered region 66 contacts force wall 46 in recess 48 and drives nosepiece 18 longitudinally towards cutter body 12. Each lock pin 64 may include a recessed tool engagement portion 70 (e.g. a hexagonal portion) configured to receive an appropriate wrench for tightening and loosening of the lock pin.

By way of modification, lock pin 64 could be formed from a pin including a tapered region 66 and a separate set screw. This configuration permits the use of standard components such as tapered pins and setscrews.

To prevent rotation of nosepiece 18 with respect to cutter body 12, nosepiece 18 preferably includes a key 71 extending from first surface 52. Key 71 is preferably rectangular and extends intermediate exterior circumferential surface 56 and cavity 58 on each side of cavity 58. A corresponding keyway 72 is recessed in abutment surface 32 of cutter body 12. Thus, when nosepiece 18 is placed over head 24, key 71 engages keyway 72 and prevents rotation of nosepiece 18 with respect to cutter body 12.

Figure 7:
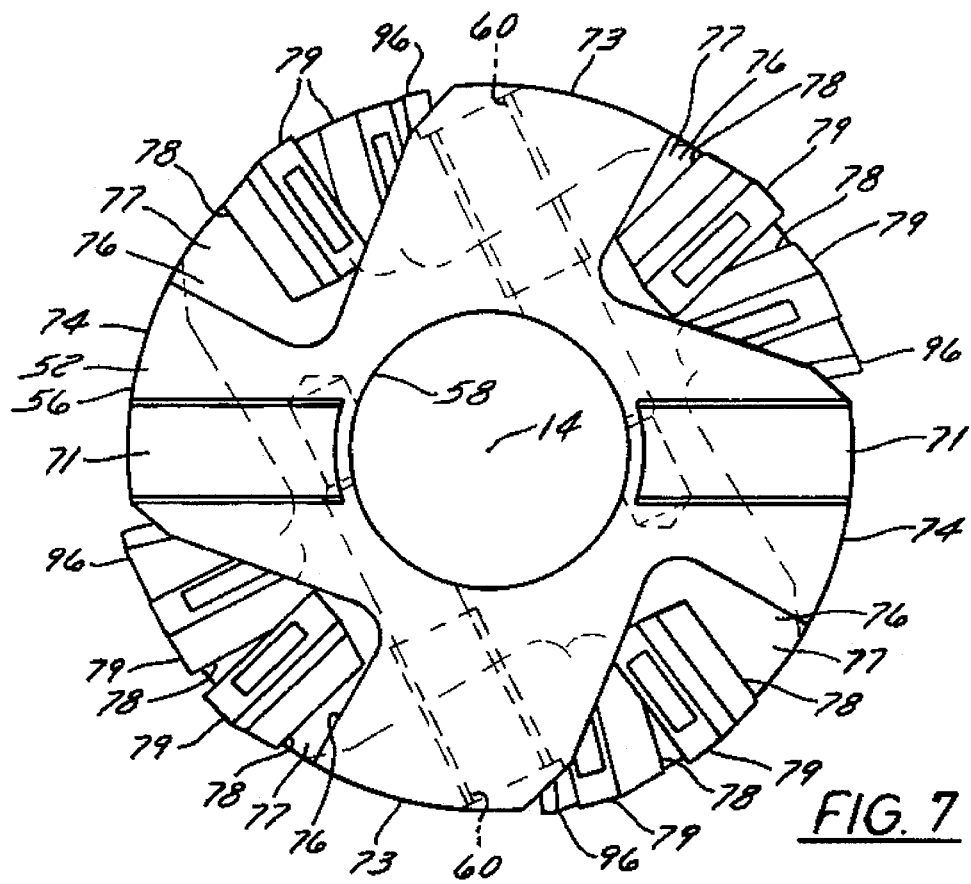
FIG. 7 is a back view of the nosepiece.

Although nosepiece 18 can be made in a variety of styles depending on the particular machining operation for which it is designed, the illustrated embodiment is of a helical nosepiece 18 used for a variety of cutting operations, such as milling. As illustrated generally in FIGS. 7 and 8, helical nosepiece 18 includes a plurality of ribs and preferably a first pair of opposing ribs 73 and a second pair of opposing ribs 74. Each of the ribs 73 and 74 is separated from the next adjacent rib by a flute 76. A plurality of cutter insert receiving surfaces 78 are spaced along a leading surface 77 of each rib 73 and 74. Surfaces 78 are generally longitudinally staggered from one another on each adjacent rib as on cutter body 12. This ensures that when cutter inserts, such as cutter inserts 79 disposed in flutes 76, are attached to receiving surfaces 78 a uniform cut is made along the entire longitudinal extent of exterior circumferential surface 56.

Figure 8:
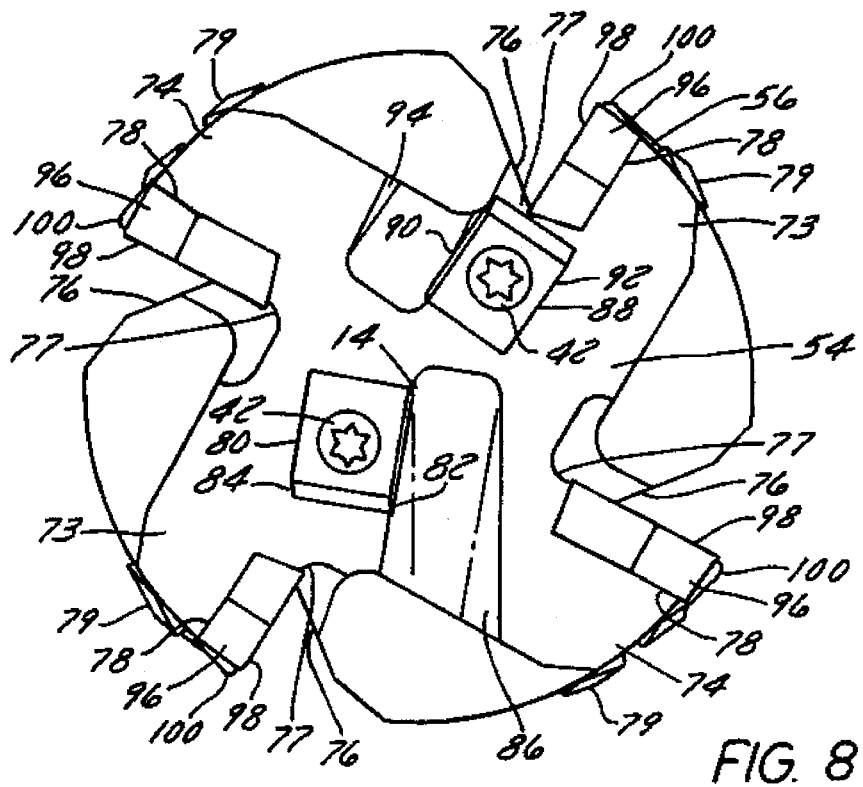
FIG. 8 is a front view of the cutting device showing the frontal face of the nosepiece.

As illustrated in FIG. 8, second surface 54 is also configured to receive a variety of cutter inserts so cutting will be achieved across the entire diameter of second surface 54, i.e. cutting will occur from central longitudinal axis 14 to at least the outer extent of each of the ribs 73 and 74. Thus, helical nosepiece 18 cuts longitudinally along its entire exterior circumferential surface 56 and also radially across the entire diameter of second surface 54. Nosepiece 18 will actually cut a diameter slightly wider than the diameter of nosepiece 18 since the outermost cutter inserts extend slightly radially outward from exterior circumferential surface 56.

The preferred arrangement of cutter inserts on nosepiece 18 and the configuration of second surface 54 will now be described; however, different arrangements of the cutter inserts and different configurations of nosepiece 18 are within the scope of the invention. A first cutter insert 80 is disposed at the most radially inward position on second surface 54. First cutter insert 80 includes at least one cutting edge 82 and is preferably disposed within a recess 84 in second surface 54. A relief 86 is disposed in second surface 54 proximate cutting edge 82 and extending to one of the flutes 76 to provide an escape for material cut loose by cutting edge 82 as nosepiece 18 is rotated into a material. Cutting edge 82 overlaps central longitudinal axis 14 and then extends radially outward therefrom. The overlap of central longitudinal axis 14 is necessary so material may be cleanly and completely removed by first cutter insert 80 in a circular pattern having a radius extending from central longitudinal axis 14 to the outer extent of cutting edge 82.

A second cutter insert 88 includes at least one cutting edge 90 and is preferably disposed in a recess 92 in second surface 54. A relief 94 is disposed in second surface 54 proximate cutting edge 90 to direct shavings and particles cut loose by cutting edge 90 away from second surface 54, preferably towards one of the flutes 76. Second cutter insert 88 is disposed so that its cutting edge 90 cuts an annular path about central longitudinal axis 14 when nosepiece 18 is rotated. The annular path cut by insert 88 overlaps the circular pattern cut by cutting edge 82 of first cutter insert 80. Thus, as second surface 54 of nosepiece 18 is rotated into a material, first cutter insert 80 and second cutter insert 88 combine to cut a circular pattern which extends smoothly and uniformly from central longitudinal axis 14 to the radially outward extent of cutting edge 90 on second cutter insert 88.

A plurality of outer cutter inserts 96, preferably four, are disposed to cut the radially outermost path. Each outer cutter insert 96 is attached at a cutter insert receiving surface 78 located on the leading surface 77 of each rib 73 and 74. As illustrated in FIG. 8, each outer cutter insert 96 preferably includes a radial cutting edge 98 disposed along second surface 54 and a longitudinal cutting edge 100 disposed along exterior circumferential surface 56. Thus, as nosepiece 18 is rotated, each outer cutter insert 96 cuts both a radially annular path along second surface 54 and a longitudinal path along exterior circumferential surface 56.

Preferably, outer cutter inserts 96 have one longer cutting edge and one shorter cutting edge. The outer cutter inserts 96 disposed on ribs 74 are oriented so radial cutting edge 98 is longer than longitudinal cutting edge 100. This ensures that the radially annular path cut by these cutter inserts overlaps the path cut by second cutter insert 88. However, the outer cutter inserts 96 located on ribs 73 are oriented so that the radial cutting edge 98 is the shorter cutting edge and the longitudinal cutting edge 100 is the longer cutting edge. The orientation of these inserts 96 permits more room for the mounting of first and second cutter inserts 80 and 88, respectively.

The various cutter inserts may be made in a variety of shapes and configurations and from a variety of materials (e.g. carbides, ceramics), but they are preferably indexable carbide inserts. The inserts are attached to nosepiece 18 by fasteners 42 preferably the same as inserts 40 are attached to cutter body 12.

As an example of the operation of apparatus 10, assume that an end milling operation is desired and that cutter body 12 is appropriately mounted in a machine tool. Retainer 22 is first threaded into threaded bore 30 of cutter body 12 and tightened down with an appropriate wrench. Nosepiece 18 is then placed over retainer 22, allowing head 24 to be received in cavity 58 of nosepiece 18. Simultaneously, key 71 slides into keyway 72 to prevent rotation of nosepiece 18 with respect to cutter body 12. Lock pins 64 are then be inserted into bores 60 of nosepiece 18 and into cooperation with recess 48 disposed in head 24. As each lock pin 64 is tightened, its tapered region 66 acts against force wall 46 and forces nosepiece 18 into tight engagement with cutter body 12.

Once nosepiece 18 is securely attached to cutter body 12, apparatus 10 may be rotated and nosepiece 18 may be plunged into a material, such as steel. As nosepiece 18 moves into the steel material, first cutter insert 80, second cutter insert 88, and outer cutter inserts 96 cooperate to cut a circular pattern across at least the diameter of second surface 54. Simultaneously, the longitudinal cutting edges 100, in cooperation with cutter inserts 79 disposed along exterior circumferential surface 56, and cutter inserts 40 of cutter body 12, cooperate to cut longitudinally along the circumference of nosepiece 18 and cutter body 12. Thus, apparatus 10 may be plunged longitudinally into the material being cut or it may be moved in a transverse direction to further cut material as desired.

It will be understood that the foregoing description is of a preferred exemplary embodiment of this invention and that the invention is not limited to the specific forms shown. For example, the cutter body and nosepiece may have configurations other than helical configurations, the nosepiece may include a different arrangement of cutter inserts, the recess and force wall used to lock the nosepiece to the cutter body may be formed in a variety of ways, different numbers of lock pins may be used, and various mechanisms for preventing rotation of the nosepiece with respect to the cutter body may be employed. These and other modifications may be made in the design and arrangement of the elements without departing from the scope of the invention as expressed in the appended claims.

What is claimed is:

1. A nosepiece assembly configured to receive a plurality of cutter elements, the nosepiece assembly being designed for attachment to a cutter body having a mounting end that includes an abutment surface and is rotatable about a central longitudinal axis, the nosepiece assembly comprising:

a retainer configured to be attached to the mounting end, the retainer having at least a retainer portion extending from the mounting end, the retainer portion having a force wall disposed generally transverse to the central longitudinal axis;

a nosepiece having a first surface configured for engagement with the abutment surface, a second surface axially opposite the first surface, and an exterior circumferential surface extending between the first and second surfaces, the nosepiece including a cavity disposed through the first surface and configured to receive the retainer portion;

at least one bore extending intermediate the exterior circumferential surface and the cavity, the at least one bore being oriented slightly offset from the force wall when the nosepiece is placed over the retainer portion;

at least one lock pin configured for insertion into the bore to engage the force wall, wherein as the at least one lock pin is inserted farther into its corresponding bore the nosepiece is forced more tightly against the abutment surface;

wherein the retainer includes a bolt having a threaded region which can be threadably engaged with a threaded mounting bore extending into the cutter body through the abutment surface;

wherein the retainer portion is a head of the bolt, the head including an annular groove configured to include the force wall; and wherein the at least one bore has a threaded region and the at least one lock pin has a corresponding threaded portion, the at least one lock pin further including a tapered region which acts against the force wall to move the nosepiece into tighter engagement with the abutment surface as the lock pin is progressively turned into the at least one bore.

2. The nosepiece assembly of claim 1, wherein the cavity extends a portion of the distance between the first surface and the second surface.

3. The nosepiece assembly of claim 2, wherein the nosepiece includes a key extending from the first surface and the abutment surface includes a keyway for receiving the key to prevent rotation of the nosepiece with respect to the cutter body.

4. The nosepiece assembly of claim 3, wherein the second surface includes a plurality of recesses for receiving cutter elements, the recesses being disposed so the cutter elements will be radially overlapped from the central axis to the exterior circumferential surface.

5. The nosepiece assembly of claim 1, wherein the nosepiece is helical having helical ribs separated by flutes along the exterior circumferential surface.

6. The nosepiece assembly of claim 5, wherein the helical ribs include a plurality of receiving surfaces for receiving cutter inserts along each helical rib.

7. A cutting apparatus for use with a multi-axis milling machine, the cutting apparatus comprising:

a cutter body connectable to the multi-axis milling machine for rotation about a central longitudinal axis, the cutter body further including a plurality of helical ribs and a mounting end having a threaded center bore and a keyway, the threaded center bore being disposed generally along the central longitudinal axis;

a retainer bolt including a threaded end configured for engagement with the threaded center bore, the retainer bolt including a head having a recess defined in part by a force wall extending generally transverse to the central longitudinal axis;

a nosepiece having a first surface, a second surface axially opposite the first surface, and an exterior circumferential surface extending between the first and second surfaces, the first surface including a key which matingly engages the keyway, the second surface being configured to receive cutter inserts, and the exterior circumferential surface including a plurality of helical nosepiece ribs separated by flutes, the nosepiece further including:

a cavity disposed through the first surface for receiving the head; and a bore extending intermediate the exterior circumferential surface and the cavity, the bore having a threaded region and being oriented in general alignment with the recess and slightly offset from the force wall; and a lock pin having a threaded portion for engagement with the threaded region of the bore, the lock pin further having a tapered portion which frictionally engages the force wall and forces the nosepiece towards the cutter body as the lock pin is rotated and moved further into the bore.

8. The cutting apparatus of claim 7, wherein the second surface includes cutter element recesses appropriately oriented to receive cutter elements positioned so upon rotation of the nosepiece the cutter elements cut a circular disk of at least the diameter of the entire second surface.

9. The cutting apparatus of claim 8, wherein the recess is an annular groove and the nosepiece includes two bores extending at least intermediate the exterior circumferential surface and the cavity on generally opposite sides of the head.

* * * * *